US009410053B2

(12) United States Patent
Kamel et al.

(10) Patent No.: US 9,410,053 B2
(45) Date of Patent: Aug. 9, 2016

(54) AQUEOUS COATING COMPOSITION AND ANTI-GLARE COATING FORMED THEREFORM

(71) Applicant: Rohm and Haas Company, Philadelphia, PA (US)

(72) Inventors: Nader N. Kamel, Doylestown, PA (US); Edward La Fleur, Holland, PA (US); Partha S. Majumdar, Harleysville, PA (US); Edwin Hugh Nungesser, Horsham, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 14/422,594

(22) PCT Filed: Sep. 18, 2013

(86) PCT No.: PCT/US2013/060267

§ 371 (c)(1),
(2) Date: Feb. 19, 2015

(87) PCT Pub. No.: WO2014/047094

PCT Pub. Date: Mar. 27, 2014

(65) Prior Publication Data

US 2015/0197659 A1 Jul. 16, 2015

Related U.S. Application Data

(60) Provisional application No. 61/702,435, filed on Sep. 18, 2012.

(51) Int. Cl.

| | |
|---|---|
| ***C09D 5/00*** | (2006.01) |
| ***C09D 5/02*** | (2006.01) |
| ***C09D 5/16*** | (2006.01) |
| ***C09D 7/12*** | (2006.01) |
| ***C09D 133/02*** | (2006.01) |
| ***C08F 285/00*** | (2006.01) |
| ***C09D 151/00*** | (2006.01) |
| *C08F 265/06* | (2006.01) |

(52) U.S. Cl.

CPC ............ *C09D 133/02* (2013.01); *C08F 285/00* (2013.01); *C09D 5/006* (2013.01); *C09D 151/003* (2013.01); *C08F 265/06* (2013.01); *C08L 2201/10* (2013.01); *C08L 2203/16* (2013.01); *C08L 2205/03* (2013.01); *C08L 2207/53* (2013.01)

(58) Field of Classification Search

CPC .. C09D 5/006; C09D 151/003; C09D 133/02; C08L 2201/10; C08L 2203/16; C08L 220/03

See application file for complete search history.

(56) References Cited

U.S. PATENT DOCUMENTS

| | | | | |
|---|---|---|---|---|
| 5,237,004 A * | 8/1993 | Wu | C08F 265/04 | 525/228 |
| 5,385,960 A * | 1/1995 | Emmons | B82Y 30/00 | 523/200 |
| 6,080,802 A * | 6/2000 | Emmons | B82Y 30/00 | 523/205 |
| 6,818,697 B2 * | 11/2004 | Zhang | C08F 265/04 | 523/201 |
| 6,930,141 B2 * | 8/2005 | Gebhart | C08L 33/06 | 524/502 |
| 7,829,626 B2 | 11/2010 | Chiou et al. | | |
| 7,893,162 B2 | 2/2011 | Lafleur et al. | | |
| 8,563,130 B2 | 10/2013 | Chung et al. | | |
| 8,987,350 B2 * | 3/2015 | Li | C09D 5/028 | 523/205 |
| 2013/0084442 A1 * | 4/2013 | Akutagawa | C09D 127/20 | 428/212 |
| 2013/0247985 A1 | 9/2013 | Tysak et al. | | |

FOREIGN PATENT DOCUMENTS

| | | |
|---|---|---|
| CN | 102073073 A | 5/2011 |
| DE | 4125857 A1 | 2/1993 |

OTHER PUBLICATIONS

PCT/US2013/060267, Nov. 21, 2013, International Search Report and Written Opinion.

PCT/US2013/060267, Apr. 2, 2015, International Preliminary Report on Patentability.

* cited by examiner

*Primary Examiner* — Robert Harlan

(57) ABSTRACT

Provided is an aqueous coating composition including: particular amounts of certain first solid polymeric particles having an average diameter of 0.60-0.99 μm; certain second solid polymeric particles having an average diameter of 2-20 μm, and mixtures thereof; and, third solid polymeric particles having a calculated Tg of from −60 C to 120° C. and an average particle diameter of from 50 nm to 500 nm; wherein the second solid polymeric particles have a K10 value of less than 1.9E+10 $N/m^2$; wherein the difference between the refractive index of the outer surface of the second solid polymeric particles and the refractive index of the third solid polymeric particles is between 10E-4 to 10E-2; and wherein the aqueous coating composition comprises less than 10% by volume, inorganic extender particles. A method for providing a coating from the aqueous coating composition and a low glare coating so formed are also provided.

8 Claims, No Drawings

AQUEOUS COATING COMPOSITION AND ANTI-GLARE COATING FORMED THEREFORM

This invention relates to an aqueous coating composition, a method for providing a coating therefrom, and an anti-glare polymeric coating. In particular, this invention relates to an aqueous coating composition including: first solid polymeric particles selected from the group consisting of: multi-stage graded refractive index (grin) composition copolymer particles having an average diameter of 0.60-0.99 μm, multi-stage copolymer particles having an average diameter of 0.60-0.99 μm and a rubbery core having a calculated glass transition temperature ($T_g$) of 20° C. or less, and mixtures thereof; second solid polymeric particles selected from the group consisting of: multi-stage graded refractive index (grin) composition copolymer particles having an average diameter of 2-20 μm, multi-stage copolymer particles having an average diameter of 2-20 μm and a rubbery core having a calculated glass transition temperature ($T_g$) of 20° C. or less, and mixtures thereof; and, third solid polymeric particles having a calculated Tg of from −60° C. to 120° C. and an average particle diameter of from 50 nm to 500 nm; wherein the dry weight ratio of the first solid polymeric particles to the second solid polymeric particles is from 0.25:1 to 2:1; wherein the dry weight ratio of the sum of the first solid polymeric particles and the second solid polymeric particles to the third solid polymeric particles is from 0.15:1 to 10:1; wherein the second solid polymeric particles have a K10 value of less than 1.9E+10 $N/m^2$; wherein the difference between the refractive index of the outer surface of the second solid polymeric particles and the refractive index of the third solid polymeric particles is between 10E-4 to 10E-2; and wherein the aqueous coating composition includes less than 10% by volume, inorganic extender particles.

This invention pertains to a polymeric coating composition that is useful for anti-glare coatings and especially beneficial for coatings of low thickness applied over a substrate. Anti-glare coatings provide a low surface gloss when applied over a substrate and are commonly used for coatings over plastics, glass, wood and cement based materials. It is very common to use coatings that contain inorganic particulate materials such as silica or silicate particles, also known in the coatings art as extenders, flatting agents, and matting agents, to provide an anti-glare property. In some uses of anti-glare coatings, it is highly desirable that the coating also provides a high degree of contact color clarity so that after the coating is dried, the underlying substrate is plainly visible to someone observing the substrate. The combination of anti-glare and optical clarity is especially important for marketing and advertising purposes. For example, a package that is placed on a shelf or in a refrigerator unit in a store that is exposed to store lighting may appear shiny and highly reflective and as a result it is difficult for a shopper to recognize of the specifics of the product such as the manufacturer or type of product in the package. The use of inorganic extenders in an anti-glare coating serves to reduce the glare of the package and assist in helping a shopper identify the specifics of the product. However, the use of inorganic extenders is problematic in two aspects. Firstly, the refractive index of the inorganic extender can be significantly different than that of the binding polymer or the dispersion of the inorganic material can be poor; in both cases this leads to haze development in the coating which also leads to an obliteration of the product specifics i.e. information relevant to the content of the package. Secondly, inorganic extenders are typically hard and this results in a coating that is inherently rough to the feel or touch. Optimum aesthetic value of anti-glare packaging is not obtainable using inorganic extenders in coatings.

An alternative to the use of inorganic extenders for anti-glare coatings is the use of polymeric particles in anti-glare coatings. Polymeric particles having a particle diameter of 1-20 μm are particularly useful for anti-glare applications. The advantage of organic polymers is based on the ability to matte a surface, potentially being of a close refractive index match to the binding polymer, the potential of being soft and of being deformable while returning to its initial dimension after some pressure is applied.

U.S. Pat. No. 7,829,626 discloses matte coatings for leather including a binder component and certain copolymer duller particles having an average diameter of 1-20 microns.

The problem we have solved with this invention is the ability to provide a coating having antiglare properties over a range of coating thicknesses by the use of a particular blend of two polymeric particles differing in size and a third polymeric particle that functions as a binder for the coating.

Key targets for anti glare coating include the ability to form a film and wet out the substrate, particularly polyolefin substrates, especially at the lower end of the coat weight targets, such as from 1.4 to 1.6 lbs./ream (2.19-2.5 μm). The gloss target for an anti-glare matte coating is typically between 5 to 25, measured at 60°.

In a first aspect of the present invention there is provided an aqueous coating composition comprising: first solid polymeric particles selected from the group consisting of: multi-stage graded refractive index (grin) composition copolymer particles having an average diameter of 0.60-0.99 μm, multi-stage copolymer particles having an average diameter of 0.60-0.99 μm and a rubbery core having a calculated glass transition temperature ($T_g$) of 20° C. or less, and mixtures thereof; second solid polymeric particles selected from the group consisting of: multi-stage graded refractive index (grin) composition copolymer particles having an average diameter of 2-20 μm, multi-stage copolymer particles having an average diameter of 2-20 μm and a rubbery core having a calculated glass transition temperature ($T_g$) of 20° C. or less, and mixtures thereof; and, third solid polymeric particles having a calculated Tg of from −60° C. to 120° C. and an average particle diameter of from 50 nm to 500 nm; wherein the dry weight ratio of said first solid polymeric particles to said second solid polymeric particles is from 0.25:1 to 2:1; wherein the dry weight ratio of the sum of said first solid polymeric particles and said second solid polymeric particles to said third solid polymeric particles is from 0.15:1 to 10:1; wherein said second solid polymeric particles have a K10 value of less than 1.9E+10 $N/m^2$; wherein the difference between the refractive index of the outer surface of said second solid polymeric particles and the refractive index of said third solid polymeric particles is between 10E-4 to 10E-2; and wherein said aqueous coating composition comprises less than 10% by volume, inorganic extender particles.

In a second aspect of the present invention there is provided a method for providing a coating comprising: (a) forming said aqueous coating composition of the first aspect of the present invention; (b) applying said aqueous coating composition to a substrate; and, (c) drying, or allowing to dry, said aqueous coating composition; wherein said provided coating has a dry film thickness of from 0.8 to 3 times the average diameter of said.

In a third aspect of the present invention there is provided a coating formed by the method of the second aspect of the present invention wherein said coating has a 60° specular gloss of from 5 to 25.

The aqueous coating composition of the present invention includes first solid polymeric particles selected from the group consisting of: multi-stage graded refractive index (grin) composition copolymer particles having an average diameter of 0.60-0.99 μm; multi-stage copolymer particles having an average diameter of 0.60-0.99 μm and a rubbery core, the core having a calculated glass transition temperature ($T_g$) of 20° C. or less; and mixtures thereof. By "aqueous" herein is meant that the continuous phase of the composition is predominantly water, preferably more than 70% by weight water; optional other components of the continuous phase are water-soluble solvents, oligomers, polymers, and the like.

The aqueous coating composition of the present invention includes first solid polymeric particles, second solid polymeric particles, and third solid polymeric particles. By "solid polymeric particles" herein is meant that the polymeric particles, when dry, do not include one or more voids.

The first solid polymeric particles have an average diameter of 0.60-0.99 μm, preferably of 0.80-0.90 μm. Preferably, the first solid polymeric particles are multi-stage polymers with, for example, a core-shell or other multi-stage morphology, such as a multilobal structure. Multi-stage first solid polymeric particles include a polymeric core phase and one or more polymeric shell phases and can be a graded refractive index (grin) composition. The core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomers polymerizable by free-radical initiation. Preferably, the as described by their predominant components are acrylic multi-stage copolymer particles, vinyl multi-stage copolymer particles, multi-stage olefin polymer particles, multi-stage polysiloxane particles, multi-stage synthetic rubber copolymer particles, multi-stage urethane copolymer particles, water-dispersible graft copolymer particles, mixtures thereof, combinations thereof, and mixtures thereof with a single stage crosslinked (co)polymer. Particularly preferred are acrylic multi-stage copolymer particles due to their heat, moisture and UV stability at an attractive cost.

In one embodiment, the first solid polymeric particles are multi-stage polymers having rubbery cores, i.e. core polymers having a calculated Tg of 20° C. or less, or, alternatively, 10° C. or less. Rubbery cores may include synthetic or natural rubbers, or, preferably, acrylic rubbers. Acrylic rubber cores include alkyl acrylate copolymers, the alkyl group having from 2 to 8 carbon atoms, copolymerized with from 0 to 15 wt. %, preferably from 0 to 10 wt. %, of one or more crosslinkers, based on the total weight of core monomers, from 0 to 15 wt. %, preferably from 0 to 10%, of one or more graftlinker, based on the total weight of core monomers, and from 0 to 50 wt. % of one or more copolymerizable ethylenically unsaturated monomer, based on the total weight of core monomers. Of the one or more polymer shells surrounding the acrylic rubber, the outermost shell polymer is thermodynamically compatible with the second solid polymeric particles. The shell(s) may comprise from 0 to 40 wt. % of the multistage particles.

In rubbery core polymers for the preferred alkyl acrylate is t-butyl acrylate or n-butyl acrylate. The copolymerizable ethylenically unsaturated monomer or monomers may be mono ethylenically unsaturated monomers, such as alkyl methacrylates and mono ethylenically unsaturated arenes, e.g. styrene. Ethylenically unsaturated arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The refractive index of the core polymer and of the second polymeric particle may, optionally, match exactly to produce an almost completely transparent composition.

Crosslinking monomers suitable for use in the core polymer are generally di- or poly-ethylenically unsaturated monomers copolymerizable with the other core monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth)crylates, diallyl phthalate, and the like. The preferred crosslinking monomers are butylene glycol diacrylates.

Graftlinking monomers suitable for use in the core polymer generally are di- or poly-ethylenically unsaturated monomers copolymerizable with the other core monomers and having sufficiently low reactivity of one of the unsaturated groups to allow significant residual unsaturation to remain in the core polymer, such as, for example, allyl methacrylate (ALMA), allyl acrylate, diallyl maleate, allyl acryloxypropionate and the like. The preferred graftlinking monomer is ALMA.

Surrounding the core of a multi-stage polymer particle is one or more shells of polymer. The shell polymers may represent from about 0.1 to about 40%, preferably, from about 5 to about 40%, and, more preferably, from about 15 to about 35%, based on the total particle weight.

The outer shell polymer of multi-stage first solid polymeric particles is preferably thermodynamically compatible with the polymer at the surface of the second solid polymeric particles. For example, a shell of poly(methyl methacrylate) will be thermodynamically compatible with a second polymer of poly(methyl methacrylate) or poly(vinyl chloride). Other such compatible polymer combinations for the first and second solid polymeric particles are known to those skilled in the art, and others may readily be determined by routine experimentation, as for example by preparing blends of proposed first and second solid polymeric particles and examining the blends for such evidence of compatibility as absence of haze, existence of a single glass transition temperature, and the like.

The first solid polymeric particles may be made by any process that can provide particles having an average particle diameter of 0.60-0.99 μm. The first solid polymeric particles may be formed by methods known in the art such as, for example, emulsion polymerization, seeded growth processes, and suspension polymerization processes. Such polymers are described, for example, in U.S. Pat. Nos. 4,403,003; 7,768,602; and 7,829,626, and are also exemplified herein. The polymer may be may be made in a multiple step process such as a core/shell process that may result in a multiphase particle or in a particle in which the phases co-mingle for a gradient of composition throughout the particle, or in a gradient process in which the composition is varied during one or more stages.

Preferably, the first solid polymeric particles are formed by emulsion polymerization. In a preferred embodiment of the present invention, first solid polymeric particles are prepared by aqueous emulsion polymerization of at least one monomer component of either the core or single stage (co)polymer to form emulsion (co)polymer or oligomer seed particles, followed by swelling the seed particles with one or more monomer components of the core, e.g. via absorption, and polymerizing the one or more monomers within the emulsion seed particles to yield the particles of a desired average diameter and, preferably, having a narrow particle size distribution. The swelling and polymerizing steps may be repeated until the particles have grown to the desired core or single stage (co)polymer size. Where seed particles are pre-made, particles of varying size and composition suitable for use as first solid polymeric particles can be produced by using appropriately sized swellable (co)polymer or oligomer seeds. Seed particles may be made by conventional emulsion (co)polymerization. Suitable seed polymer precursors for making may include, for example, oligomeric emulsion polymer particles in the range 30-500 nm. One or more or all swelling and polymerization steps may be performed in the absence of conditions limiting the molecular weight of the resulting (co) polymer, such as, for example, in the absence of a chain-transfer agent. However, initially formed emulsion (co)polymer seed particles do not swell as readily as subsequent, larger particles having a lower overall molecular weight formed under conditions limiting the molecular weight of the resulting (co)polymer. At least the final (co)polymerization stage is typically carried out under conditions which do not limit the polymer molecular weight.

More preferably, the core (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more or all of the swelling and polymerization steps can be performed using the conditions which restrict the polymer molecular weight and such steps can be alternated, followed by or subsequent to swelling and polymerization steps may be performed in the absence of conditions limiting the molecular weight of the resulting (co) polymer. More preferably, the core or single stage (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more or all of the swelling and polymerization steps can be performed using the conditions which restrict the polymer molecular weight and such steps can be alternated, followed by or subsequent to swelling and polymerization steps may be performed in the absence of conditions limiting the molecular weight of the resulting (co) polymer.

Alternatively, dry polymer particles can be processed to a desired size and then dispersed in water if they are water dispersible, i.e. include hydrophilic groups such as hydroxyl, carboxyl or amine groups, or, alternatively, emulsified to form an oil-in-water emulsion. For example, dry particles having a Tg above room temperature or 25° C. may be ground, such as by jet milling, and, if needed, run through a particle classifier to create the desired average diameter and, if desired, a narrow particle size distribution. Dry rubbery or thermoplastic particles may be cryoground and run through a classifier to create the desired average diameter.

Other alternative techniques to manufacture emulsion (co) polymers or (co)polymer cores are disclosed in the literature, such as, for example, Japanese Kokai Publication 62-84156 which describes a growout process involving polymerization of mixtures of monofunctional and polyfunctional monomers, followed by a staging with a high concentration of polyfunctional monomers, with oil-soluble initiators onto a pre-formed seed to form fine granules.

Crosslinking of any (co)polymer and any graftlinking of a core (co)polymer to a shell polymer results from inclusion of one or more copolymerizable crosslinking and/or graftlinking monomers in the polymerizable monomer mixtures. Alternatively, the core polymer may be crosslinked and the core polymer may be graftlinked to the shell polymer using other known techniques, for example, post-cure reactions, such as by forming a copolymer from a monomer having a pendant peroxide group and then activating the peroxide by heating to a temperature higher than that used in the polymerization. The activated peroxide group will promote graftlinking and crosslinking of the core/shell polymer components. In another example, crosslinking or graftlinking may be achieved post-cure by adding to the polymerization a second free-radical initiator that is stable at the initial polymerization temperature and is activated by light or at a higher temperature, followed by activating the initiator.

It is preferred that gradient multi-stage first solid polymeric particles possess resistance to deformation and low thermoplasticity in order to retain their dimensions in conditions of high heat or of high pressure. Loss of dimension may result in higher than desired specular gloss. To provide for enhanced dimensional stability of the particle it is preferred that the multiple stage particles comprise 0.1-20% of a copolymerized multivalent crosslinking monomer, preferably 2-10%, more preferably 4-10% by weight based on the weight of the multiple stage particles. Particles with insufficient dimensional stability will tend to deform or flatten out when exposed to heat or pressure and as a result the coating surface gloss will increase at all specular angles.

Multi-stage first or second solid polymeric particles can be multilobal polymeric particles. In the case of the second solid polymeric particles, the outer polymer or lobes should be film forming. Multilobals are formed from different and relatively incompatible core and lobe (co)polymer compositions, varying to the extent that the interaction parameter, $X_{C-L}$, is greater than about 0.05. The interaction parameter can be calculated for the lobe and core polymers by the method of Krause et al., J. Chem. Physics, 43, 2144 (1965). Appropriate values of the Hildebrand solubility values necessary for the calculation may be found in Van Krevelen, "Properties of Polymers," Elsevier Publishers (New York), 1976. Multilobals may be formed by adding an initial increment of a redox couple or of a reducing agent alone and starting gradual addition feed of the appropriate lobe-forming monomer and gradual addition of the redox couple simultaneously with the monomer feed as polymerization proceeds at the same or a higher rate of addition to completion, wherein an increased the level of one or more surfactant is added with lobe-forming monomer to just below the level at which new particles are initiated. The average diameter of the multilobal particles herein is taken as the diameter a sphere of equivalent volume.

It is preferable that the first solid polymeric particles in the aqueous coating composition be stabilized so as to minimize separation or sedimentation. This may be accomplished by the use of thickening or viscosity-building materials such as, for example, alkali-soluble emulsion polymers, hydrophobically modified alkali soluble polymers, hydrophobically enhanced urethane resins, and clay-based compositions incorporated in the aqueous coating composition.

The aqueous coating composition of the present invention includes second solid polymeric particles selected from the group consisting of: multi-stage graded refractive index (grin) composition copolymer particles having an average diameter of 2-20 μm; multi-stage copolymer particles having an average diameter of 2-20 μm and a rubbery core, the core having a calculated glass transition temperature ($T_g$) of 20° C. or less; and mixtures thereof; wherein the second solid polymeric particles have a K10 value of less than 1.9E+10 N/m$^2$; and wherein the difference between the refractive index of the outer surface of the second solid polymeric particles and the refractive index of the third solid polymeric particles is between 10E-4 to 10E-2. The compositional parameters and methods of formation for the second solid polymeric particles are independently selected from those described hereinabove for the except for the range of average diameter of the particle. Both the and the second solid polymeric particles are desirably non-porous, i.e., free from voids.

The second solid polymeric particles require a K10 value (the K value at 10% compression) of less than 1.9E+10 N/m$^2$; preferably a K10 value of less than 1.9E+10 N/m$^2$ and a ratio of K0/K10 (K0 is K at full compression) of greater than 1.5, more preferably a K10 value of less than 1.9E+10 N/m$^2$ and a ratio of K0/K10 of greater than 3.0. (K values are disclosed in "Investigation for Surface Morphology and Mechanical Property Variations of Single Polymer Particles", Journal of Applied Polymer Science, Volume 104 (4) 2007, Dong Ok Kim, Jeong Hee Jin; all K values herein are those measured at a compression rate of 0.79 gram-force/sec.). In one embodiment of the present invention the, independently, have a ratio of K0/K10 of less than 2.5.

Some uses for anti-glare coatings require a low coating thickness, or low applied coating weight, relative to the diameter of the second solid polymeric particles. This is important for reasons including coating drying time and coated substrate weight. This is especially important for aqueous coatings such as, for example, packaging, leather topcoats, decorative and protective coatings. Without being bound by a particular theory it is believed that to achieve an anti-glare of low coating weight using many coating application techniques it is required that the dimensions of rigid materials used in the coating be of a size smaller than the equipment aperture or process used to deliver the coating to the substrate. For example, if a type of dragging technique (i.e., draw down or wire rod technique) is used to apply the coating it is likely that rigid particles larger than the gap size of the equipment will be dragged off of the substrate and a coating lacking in anti-glare properties will result. The required K10 value insures that the second solid polymeric particles are sufficiently deformable to remain as part of the coating structure.

Further, the difference between the refractive index of the outer surface of the second solid polymeric particles and the refractive index of the third solid polymeric particles is 10E-4 to 10E-2. The refractive index of the outer surface of the second solid polymeric particles herein is that measured at 21-23° C. using a Zeiss Jenaval Interference microscope. The refractive index of the third solid polymeric particles herein is that measured at 21-23° C. using an Abbe refractometer (using a Sodium D-line light source).

The aqueous coating composition of the present invention includes third solid polymeric particles having a calculated Tg of from −60° C. to 120° C. and an average particle diameter of from 50 nm to 500 nm.

The polymer of the third solid polymeric particles, also called "the third polymer" herein, typically includes at least one nonionic copolymerized ethylenically unsaturated monomer such as, for example, a (meth)acrylic ester monomer including methyl(meth)acrylate, ethyl(meth)acrylate, butyl(meth)acrylate, 2-ethylhexyl(meth)acrylate, decyl (meth)acrylate, hydroxyethyl(meth)acrylate, hydroxypropyl (meth)acrylate, ureido-functional (meth)acrylates and acetoacetates, acetamides or cyanoacetates of (meth)acrylic acid; styrene or substituted styrenes; ethylene; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, vinylidene fluoride, and N-vinyl pyrollidone; (meth)acrylonitrile; N-alkylol(meth)acrylamide. The use of the term "(meth)" followed by another term such as (meth)acrylate or (meth)acrylamide, as used throughout the disclosure, refers to both acrylates or acrylamides and methacrylates and methacrylamides, respectively. The third polymer may also be a urethane polymer. The third polymer is substantially uncrosslinked, that is, the third polymer includes less than 1 weight %, preferably less than 0.2 weight %, based on the weight of the polymer, and more preferably 0% of a copolymerized multi-ethylenically unsaturated monomer. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The third polymer typically has an acid number of from 5 to 100, calculated by determining the number of milliequivalents of acid per gram in the first polymer and multiplying by the molecular weight of potassium hydroxide. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers are carboxylic acid monomers. More preferred monomers are (meth)acrylic acid.

The calculated glass transition temperature ("Tg") of the third polymer is from −60° C. to 100° C., preferably from −60° C. to 25° C., more preferably from −60° C. to 0° C., and most preferably from −60° C. to −10° C. "Calculated Tgs" of the polymers herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.})=w(M1)/Tg(M1)+w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers. In calculating Tgs herein the contribution of copolymerized graftlinking monomers is excluded. For multi-staged third solid polymeric particles the calculated Tg herein is that calculated from the total overall composition of the particle.

The polymerization techniques used to prepare such third solid polymeric particles, typically by emulsion polymerization, are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multistage emulsion polymer may be referred to as a core/shell polymer. The polymeric particles include two or more phases of various geometries such as, for example, core/shell or core/sheath particles, core/shell particles with shell phases incompletely encapsulating the core, and core/shell particles with a multiplicity of cores.

The average particle diameter of the third solid polymeric particles is from 50 to 500 nanometers. Processes yielding polymodal particle size distributions such as those disclosed in U.S. Pat. Nos. 4,384,056 and 4,539,361, for example, may be employed.

In the aqueous coating composition of the present invention the dry weight ratio of the sum of the first solid polymeric particles and the second solid polymeric particles to the third solid polymeric particles is from 0.15:1 to 10:1, preferably from 0.5:1 to 5:1; the dry weight ratio of the to the second solid polymeric particles is from 0.25:1 to 2:1, preferably 0.5:1 to 1.5:1; and the aqueous coating composition includes less than 10%, preferably less than 5%, more preferably less than 2%, and most preferably 0%, by volume, inorganic extender particles. The "inorganic extender particles" herein have a refractive index of less than 1.8 and typically greater than or equal to 1.3. Inorganic extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

The aqueous coating composition is prepared by using techniques which are well known in the coatings art. The first, second, and third solid polymeric particles are added under low shear stirring along with other coatings adjuvants as desired. The aqueous coating composition may contain, in addition to the first, second, and third solid polymeric particles, film-forming or non-film-forming solution or emulsion polymers not within the parameters of the first, second, or third solid polymeric particles, in an amount of 0% to 100% by weight of the sum of the first, second, and third solid polymeric particles, pigments, and conventional coatings adjuvants such as, for example, emulsifiers, coalescing agents, antifreezes, curing agents, buffers, neutralizers, thickeners, rheology modifiers, humectants, wetting agents, plasticizers, antifoaming agents, UV absorbers, fluorescent brighteners, light or heat stabilizers, biocides, chelating agents, dispersants, colorants, colorant dispersions, waxes, water-repellants, pigments, extenders, and anti-oxidants.

As is generally the case in aqueous compositions including multiple ingredients and, particularly, multiple particulate species, it is beneficial to select materials for inclusion in the aqueous coating composition that interact favorably reducing the possibility of decreasing the colloidal stability of the individual components, changing the solubility of the components, or precipitating any of the components in the aqueous coating or during any drying process. In one aspect, undesirable mixtures could cause the generation of gel or grit which could interfere with attaining the desired coating gloss. In another aspect undesirable mixtures can cause coating separation or gelling prior to being able to apply the aqueous coating composition on a substrate and can create a dry coating with defects that lead to poor physical performance. It is well known by those skilled in the art that the incorrect selection of components of a coating mixture such as, for example, dispersants, thickeners, biocides, and solvents can create potential problems. A further consideration is the colloidal compatibility of the first, second, and third solid polymeric particles. Frequently, the first, second, and third solid polymeric particles are provided as aqueous dispersions of colloidally stabilized particles. It is important that the polymeric particles do not exhibit colloidal incompatibility in the aqueous coating composition. This may be accomplished by combining particles of the same charge (i.e all particles contain either a negative charge or a positive charge) but also may be accomplished by combining particle(s) of one charge with particle(s) essentially without a charge or slightly different charge. Blending particles of substantially different charges creates a colloidal incompatibility which can lead to particle aggregation (or particle grit) or complete gelling of the coating composition. A colloidally compatible mixture in this sense will result in a non-gelled coating composition or a coating free of grit.

In certain embodiments a photosensitive compound such as, for example, benzophenone or a substituted acetophenone or benzophenone derivative as is taught in U.S. Pat. No. 5,162,415 may be added. In certain embodiments the aqueous coating composition of the invention has a VOC (volatile organic compound) level of less than 150 g/liter of coating, alternatively of less than 100 g/liter, or further alternatively of from 0 g/liter to 50 g/liter.

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

In the method for providing a coating of the present invention the aqueous coating composition is applied to a substrate and, dried, or allowed to dry. The aqueous coating composition is typically applied to a substrate such as, for example, wood, metal, polymeric compositions such as polyester, polyolefin, polyvinyl chloride, and the like, leather, paper, cardboard, woven or nonwoven textiles, cementitious substrates such as, for example, concrete, stucco, drywall, and mortar, previously printed, painted or primed surfaces, and weathered surfaces. The aqueous coating composition may be applied to a substrate using conventional coatings application methods such as, for example, paint brush, paint roller, gravure roll, curtain coater and spraying methods such as, for example, air-atomized spray, air-assisted spray, airless spray, high volume low pressure spray, and air-assisted airless spray.

Drying of the aqueous coating composition may proceed under ambient conditions such as, for example, at 5° C. to 35° C. or the coating may be dried at elevated temperatures such as, for example, from 35° C. to 150° C. It is required that the dry film thickness of the coating is from 0.8 to 3 times the average diameter of the. The coating so formed has a 60° gloss of from 5 to 25, preferably of from 9 to 12. The coating of the present invention coating, when pigmented, is preferably below its critical pigment volume concentration.

Without being bound by a specific theory, it is believed that the coating is formed from the aqueous polymeric coating in such a manner that predominantly the third solid polymeric particles fuse to form a continuous film while the first and second solid polymeric particles retain their particulate nature. Consequently, the film formation of the third emulsion polymer may benefit from coalescing agents, heat, and the like, but desirably not to a level or extent that would jeopardize the retention of the particulate identity and dimensions of the first and second solid polymeric particles.

The following examples serve to illustrate the invention.

ABBREVIATIONS

Ethyl acrylate EA
n-Butyl acrylate BA
Acrylic acid AA
Methacrylic acid MAA
Allyl methacrylate ALMA
DI water=deionized water Measurement of Particle Size.

Particle diameters of from 40 nm to 500 nm herein are those measured with a Brookhaven Instruments particle size analyzer BI-90 PLUS (Brookhaven Instruments Company, 750 Blue Point Road, Holtsville, N.Y. 11742).

Particle diameters of from 0.60 microns to 0.99 microns herein are those measured using a Coulter Corporation Multisizer IIE particle size analyzer.

Particle diameters of greater than 1 micron herein are those measured using a Disc Centrifuge Photosedimentometer ("DCP") (CPS Instruments, Inc.) that separates modes by centrifugation and sedimentation through a sucrose gradient. The samples were prepared by adding 1-2 drops into 10 cc DI water containing 0.1% sodium lauryl sulfate. 0.1 cc of the sample was injected into the spinning disc filled with 15 cc. sucrose gradient. Samples were analyzed relative to a polystyrene calibration standard. Specific conditions were: sucrose gradient 2-8%; disc speed 10,000 rpm; the calibration standard was 895 nm diameter polystyrene.

Measurement of Specular Gloss:

Drawdowns of the coatings were prepared at 25° C. and 50% relative humidity (RH) using a bird applicator over white Leneta chart. The coatings were dried for 24 hrs at 25° C. and 50% RH before performing gloss measurements. ASTM D-523 method was followed to measure gloss values using a BYK micro-TRI-gloss μ gloss meter. Gloss values for each sample were reported at 60°.

Measurement of Opacity:

Opacity was measured using a Technidyne BLN-3 Opacimeter. Opacity relates to the transparency of the coating and, therefore, to the clarity of an image viewed through the coating.

Sample A.

Formation of Third Solid Polymeric Particles

Synthesis of Sample A, an 80 nm 2-stage emulsion polymer with composition: 80(96.5EA/3.5AA)//20MMA: Calculated Tg of stage 1 is −19.04° C.;

calculated Tg of Stage 2 is 105° C.

TABLE A.1

Mixtures used in the formation of Sample A

| Mixture | Component | Parts by Weight |
|---|---|---|
| A | Water | 238.58 |
| | 28% aq. sodium lauryl sulfate | 28.99 |
| | 30% aq. secondary alcohol ethoxylate (15.4 HLB) | 108.21 |
| | EA | 783.18 |
| | AA | 28.41 |
| B | 0.15% ferrous sulfate heptahydrate | 4.08 |
| C | Water | 25.49 |
| | Ammonium persulfate | 0.81 |
| D | Water | 25.49 |
| | Sodium hydrosulfite | 1.43 |
| | Ammonium hydroxide | 0.41 |
| E | Water | 20 |
| | t-Butyl hydroperoxide | 0.46 |
| F | Water | 20 |
| | Disodium salts of 2-hydroxy-2-sufinatoacetic acid and 2-hydroxy-sufonatoacetic acid, sodium sulfite. | 0.47 |
| G | MMA | 202.90 |
| H | Water | 9.18 |
| | t-Butyl hydroperoxide | 0.92 |
| I | Water | 38.74 |
| | Disodium salts of 2-hydroxy-2-sufinatoacetic acid and 2-hydroxy-sufonatoacetic acid, sodium sulfite. | 0.9 |
| J | Water | 35.69 |
| | t-Butyl hydroperoxide | 1.53 |
| K | Water | 35.69 |
| | Disodium salts of 2-hydroxy-2-sufinatoacetic acid and 2-hydroxy-sufonatoacetic acid, sodium sulfite. | 1.33 |
| L | Triethylamine | 17.84 |
| | Water | 50.98 |

A reactor equipped with a stirrer and condenser was charged with 1035 g DI water. Nitrogen was allowed to bubble through the water for 30 minutes. The reactor was then blanketed with nitrogen and charged with Mixture A. With the reactor mixture temperature below 20° C., Mixtures B, C and D were rapidly and successively added to the reactor. Within 10 minutes, the temperature rose as the polymerization started and peaked around 70° C. Ten minutes after the peak temperature, mixture E, followed by mixture F, were added. The material in the reactor was allowed to cool to 60° C. and Mixture G was added, followed by Mixtures H and I. After 5 minutes, mixtures J and K were separately metered into the reactor over 30 minutes while the batch was cooled. The neutralizer was then added to partially neutralize the polymerized acid and the polymer sample was then filtered through a 100 mesh screen to remove coagulum.

Sample B.

Formation of a Precursor to First Solid Polymeric Particles

Preparation of crosslinked polymer particles of 0.045 μm in diameter for making first solid polymeric particles in aqueous dispersion.

TABLE B.1

| Mixtures used in the formation of Sample B | | |
|---|---|---|
| Mixture | Component | Parts by Weight |
| A | DI Water | 180 |
| | Sodium Carbonate | 0.40 |
| B | BA | 99.3 |
| | ALMA | 0.70 |
| | 1,4-Butanediol Diacrylate | 0.25 |
| | 22.5% aqueous Sodium Dodecylbenzenesulfonate | 2.22 |
| | DI Water | 40.8 |
| C | Sodium Persulfate | 0.06 |
| | Water | 11.9 |

A reactor equipped with stirrer and condenser and blanketed with nitrogen was charged with Mixture A and heated to 83° C. To the reactor contents was added 10% of emulsified Mixture B and 25% of Mixture C. The temperature was maintained at 83° C. and the mixture was stirred for 60 minutes, after which the remaining Mixture B and Mixture C were added to the reactor with stirring over a period of 120 minutes. Stirring was continued at 83° C. for 90 minutes, after which the reactor contents were cooled to room temperature. The particle size and solids content of the resulting emulsion were 0.054 μm and 32.52% respectively.

Sample C.

Formation of a Precursor to First Solid Polymeric Particles

The particles of Sample B were grown to a 0.21 μm diameter.

TABLE C.1

| Mixtures used in the formation of Sample C | | |
|---|---|---|
| Mixture | Component | Parts by Weight |
| A | Sodium Carbonate | 0.08 |
| | 9.76% aqueous Sodium Dodecylbenzenesulfonate | 0.01 |
| | DI Water | 156.00 |
| B | 30.10% solids emulsion - Sample B | 29.80 |
| C | n-Butyl Acrylate | 81.80 |
| | Styrene | 18.20 |
| | 9.76% aqueous Sodium Dodecylbenzenesulfonate | 4.53 |
| | DI Water | 57.50 |
| D | 1-Hexanethiol/n-DDM | 18.80 |
| | 9.76% aqueous Sodium Dodecylbenzenesulfonate | 0.58 |
| | DI Water | 15.00 |
| E | Sodium Persulfate | 0.11 |
| | DI Water | 47.40 |
| F | t-Butyl Hydroperoxide 70% | 0.30 |
| | DI Water | 15.00 |
| G | Sodium Formaldehyde Sulfoxylate | 0.20 |
| | Water | 6.67 |

Mixture A was added to the reactor of Example 1 and heated to 88° C. with stirring. The air in the reactor was replaced by nitrogen. When the reactor temperature stabilized at 88° C., Mixture B was charged into the reactor. Emulsified Mixtures C and D, and Mixture E were then added to the reactor, with stirring, over a period of 300 minutes. Stirring was continued at 88° C. for 90 minutes. The reactor contents were cooled to 65° C. Mixtures F and G were added and the reactor contents were maintained at 65° C. with stirring for 1 hour, after which the reactor contents were cooled to room temperature. The resulting emulsion particles had an average diameter of 0.21 μm.

Sample D.

Formation of First Solid Polymeric Particles

The particles of Sample C were expanded to create an 0.84 μm average diameter.

TABLE D.1

| Mixtures used in the formation of Sample D | | |
|---|---|---|
| Mixture | Component | Parts by Weight |
| | Stage I | |
| A3 | DI Water | 138.50 |
| B3 | Sample C at 29.88% solids | 0.105 |
| C3 | BA | 73.60 |
| | ALMA | 6.40 |
| | 10% aqueous Sodium Dodecylbenzenesulfonate | 0.28 |
| | DI Water | 33.12 |
| D3 | t-Butyl Peroctoate | 0.427 |
| | 10% aqueous Sodium Dodecylbenzenesulfonate | 0.003 |
| | DI Water | 2.96 |
| | Stage II | |
| E3 | MMA | 19.20 |
| | EA | 0.80 |
| F3 | Sodium Formaldehyde Sulfoxylate | 0.062 |
| | DI Water | 6.67 |
| | 10% aqueous Sodium Dodecylbenzenesulfonate | 0.017 |
| G3 | t-Butyl Hydroperoxide 70% | 0.089 |
| | DI Water | 10.05 |
| | 10% aqueous Sodium Dodecylbenzenesulfonate | 0.037 |

To the reactor of Sample C was added A3 which was heated to 90° C. with stirring. The air in the reactor was replaced by nitrogen. When the reactor temperature stabilized at 90° C., Mixture B3 was charged into the reactor. Mixture C3 was emulsified with a homogenizer and charged into the reactor. The reactor was stirred at 60° C. for 1 hour. Mixture D3 was emulsified with a homogenizer and charged into the reactor. After 1 hour agitation at 60° C., the reactor was gradually heated to 65-70° C. while an exothermic polymerization took place. After reaching peak temperature, agitation was continued while the reactor was cooled to 73° C. in 30 minutes. Half of Mixture F3 was charged. Mixtures E3, the remainder of F3, and G3 were then separately added into the reactor over a period of 2 hours. The temperature was maintained between 73-75° C. and stirring was continued for 1 hour before the reactor was cooled to room temperature. The resulting first solid polymeric particles had a diameter of 0.84 μm.

Sample E.

Formation of Second Solid Polymeric Particles

Synthesis of an emulsion polymer of 5 μm average diameter having the 2 stage composition: 80(96BA/4ALMA)//20 (96MMA/4EA); Calculated Tg of stage 1 (not including ALMA) is −54.0° C.; Calculated Tg of Stage 2 is 97.5° C.

Formation of seed polymer for use in preparing particulate polymer

Unless otherwise noted, the terms “charged” or “added” indicate addition of all the mixture at once. The following mixtures were prepared:

TABLE E.1

| Reaction mixtures used in formation of seed polymer of Sample E | | |
|---|---|---|
| Mixture | Component | Parts, By Weight |
| A | DI Water | 208 |
| | Sodium Carbonate | 0.38 |

TABLE E.1-continued

| Reaction mixtures used in formation of seed polymer of Sample E | | |
|---|---|---|
| Mixture | Component | Parts, By Weight |
| B | BA | 98 |
| | Butylene Glycol Diacrylate | 0.25 |
| | ALMA | 2.0 |
| | 10% aqueous Sodium Dodecylbenzenesulfonate | 4.0 |
| | DI Water | 40 |
| C | Potassium Persulfate | 0.063 |
| | DI Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the reaction mixture was stirred for 1 hour, after which the remaining Mixture B and Mixture C were metered in to the reactor, with stirring, over a period of 90 minutes. Stirring was continued at 82° C. for 2 hours, after which the reactor contents were cooled to room temperature. The average diameter of the resulting emulsion particles was 0.2 micron.

TABLE E.2

| Mixtures used in formation of second step of Sample E | | |
|---|---|---|
| Mixture | Component | Parts by Weight |
| A2 | Sodium Carbonate | 0.08 |
| | 50% Methoxy-beta-cyclodextrin | 2.0 |
| | DI Water | 153.3 |
| B2 | Seed polymer (above) | 8.41 |
| C2 | BA | 82.0 |
| | MMA | 17.8 |
| | MAA | 0.20 |
| | 9.76% aqueous Sodium Dodecylbenzenesulfonate | 4.18 |
| | DI Water | 22.21 |
| D2 | n-Dodecyl Mercaptan | 22.00 |
| | 9.76% aqueous Sodium Dodecylbenzenesulfonate | 2.04 |
| | DI Water | 21.65 |
| E2 | Sodium Persulfate | 0.20 |
| | DI Water | 10.0 |
| F2 | t-Butyl Hydroperoxide 70% | 0.30 |
| | DI Water | 15.00 |
| G2 | Sodium Formaldehyde Sulfoxylate | 0.20 |
| | DI Water | 6.67 |

Mixture A2 was added to the reactor and heated to 88° C. with stirring. The air in the reactor was replaced by nitrogen. When the reactor temperature stabilized at 88° C., Mixture B2 was charged into the reactor. Emulsified Mixtures C2 and D2, and Mixture E2 were then added to the reactor, with stirring, over a period of 240 minutes. Stirring was continued at 88° C. for 90 minutes. The reactor contents were cooled to 65° C. Mixtures F2 and G2 were added and the reactor contents were maintained at 65° C. with stirring for 1 hour, after which the reactor contents were cooled to room temperature. The resulting emulsion particles had a diameter of 0.75 microns as measured by a Brookhaven Instruments particle size analyzer BI-90.

TABLE E.3

| Reactants used in formation of second solid polymeric particles | | |
|---|---|---|
| Mixture | Component | Parts by Weight |
| | Stage I | |
| A4 | DI Water | 1400.0 |
| B4 | Aqueous emulsion from second step (above) | 9.70 |
| C4 | BA | 768.0 |
| | ALMA | 32.0 |
| | 23% aqueous Sodium Dodecylbenzenesulfonate | 12.60 |
| | DI Water | 324.4 |
| D4 | t-Butyl Peroctoate | 3.82 |
| | 23% aqueous Sodium Dodecylbenzenesulfonate | 0.16 |
| | DI Water | 8.40 |
| | Stage II | |
| E4 | MMA | 191.7 |
| | EA | 8.30 |
| | 23% aqueous Sodium Dodecylbenzenesulfonate | 2.43 |
| | DI Water | 50.2 |
| F4 | 2% Sodium Formaldehyde Sulfoxylate in water | 40.0 |
| G4 | 4.4% t-Butyl Hydroperoxide (70%) in water | 24.90 |

To a reactor A4 was added and was heated to 76° C. with stirring. The air in the reactor was replaced by nitrogen. When the reactor temperature stabilized at 76° C., Mixture B4 was charged into the reactor. 20% of Mixture C4 was charged into the reactor. The reactor was stirred at 60-65° C. for 0.5 hours. Mixture D4 was charged into the reactor. After 23 minutes agitation at 60-65° C. an exothermic polymerization took place. After reaching peak temperature, agitation was continued while the remaining 80% of mixture C4 was added over 48 minutes. 27.5% of Mixture F4 was charged. Mixtures E4, the remainder of F4, and G4 were then separately added into the reactor over a period of 45 minutes. The temperature was maintained between 75-80° C. and stirring was continued for 1 hour before the reactor was cooled to room temperature. To the resultant dispersion of polymeric particles 1.5% of ACRYSOL™ ASE-60 was added based on the total weight of the emulsion and the pH was increased by sequential additions of triethylamine to a pH of 7-9.

TABLE A

| Measured K values | | | |
|---|---|---|---|
| Material | K(10) [10% compression] (N/m2) | K(0) [full compression] (N/m2) | Ratio of K0/K10 |
| Sample D (first polymeric particle) | 3.50E+11 | 6.79E+11 | 1.94 |
| Sample E (second polymeric particle) | 1.20E+10 | 4.12E+10 | 3.43 |

All samples were evaluated using a compression rate of 0.79 gram-force/sec

EXAMPLE 1 AND COMPARATIVE EXAMPLES A-B

Formation of Aqueous Coating Compositions and Evaluation of Dry Coatings

Example 1 and Comparative Examples A-B were formed, each at a dry weight ratio of first, second, or first and second solid polymeric particles to third solid polymeric particles of 55/45. Quantities are presented in Table 1.1 below

TABLE 1.1

Ingredients used in aqueous coating compositions

| Material | % solids | Comp. Ex. A | Comp. Ex. B | Ex. 1 |
|---|---|---|---|---|
| Sample E - 5 μm average diameter second solid polymeric particles | 31.2 | 23.07 | 0.00 | 11.54 |
| Sample D - 0.84 μm average diameter | 36 | 0.00 | 21.66 | 10.83 |
| Sample A -third solid polymeric particles | 34.8 | 16.93 | 18.34 | 17.63 |
| Total | | 40.00 | 40.00 | 40.00 |

Aqueous coating compositions were applied by gravure cylinder over an area of 8 in.×10 in. on a 2 mil MYLAR™ (PET) sheet at a level of approximately 1.5 lbs./ream (2.43 gsm). Gloss and opacity readings are the average of five readings taken at various locations on the coating presented in Table 1.2

TABLE 1.2

Formation of dry coatings

| Sample | Cylinder | Applied Weight | Visual assessment |
|---|---|---|---|
| Comp. Ex. A | 150 Q; 14.8 BCM | 2.33 gsm | Optics not acceptable due to poor wetting |
| Example 1 | 150 Q; 14.8 BCM | 2.33 gsm | Good lay down and optics |
| Comp. Ex. B | 150 Q; 14.8 BCM | 2.25 gsm | Good lay down and optics |

TABLE 1.3

Evaluation of coatings

| | Gloss - 60° | Opacity |
|---|---|---|
| Comp. Ex. A | 11.9 | 27.6 |
| Example 1 | 10.4 | 14 |
| Comp. Ex. B | 10.8 | 19.5 |

The coating of Example 1 of the invention exhibited the best balance of film formation, flow out and opacity relative to the coatings of Comparative Examples A-B.

What is claimed is:

1. An aqueous coating composition comprising:

first solid polymeric particles selected from the group consisting of: multi-stage graded refractive index (grin) composition copolymer particles having an average diameter of 0.60-0.99 μm; multi-stage copolymer particles having an average diameter of 0.60-0.99 μm and a rubbery core having a calculated glass transition temperature ($T_g$) of 20° C. or less; and mixtures thereof;

second solid polymeric particles selected from the group consisting of: multi-stage graded refractive index (grin) composition copolymer particles having an average diameter of 2-20 μm; multi-stage copolymer particles having an average diameter of 2-20 μm and a rubbery core having a calculated glass transition temperature ($T_g$) of 20° C. or less; and mixtures thereof; and, third solid polymeric particles having a calculated Tg of from −60° C. to 120° C. and an average particle diameter of from 50 nm to 500 nm;

wherein the dry weight ratio of said first solid polymeric particles to said second solid polymeric particles is from 0.25:1 to 2:1; wherein the dry weight ratio of the sum of said first solid polymeric particles and said second solid polymeric particles to said third solid polymeric particles is from 0.15:1 to 10:1; wherein said second solid polymeric particles have a K10 value of less than 1.9E+10 N/m$^2$; wherein the difference between the refractive index of the outer surface of said second solid polymeric particles and the refractive index of said third solid polymeric particles is between 10E-4 to 10E-2; and wherein said aqueous coating composition comprises less than 10% by volume, inorganic extender particles.

2. The aqueous coating composition of claim 1, wherein said first solid polymeric particles are selected from the group consisting of acrylic multi-stage copolymer particles, vinyl multi-stage copolymer particles, multi-stage synthetic rubber copolymer particles, multi-stage urethane copolymer particles, water-dispersible graft copolymer particles, mixtures thereof, and mixtures thereof with a single stage crosslinked (co)polymer.

3. The aqueous coating composition of claim 1, wherein said first solid polymeric particles, said second solid polymeric particles; and said third solid polymeric particles are acrylic polymers.

4. The aqueous coating composition of claim 3, wherein said third solid polymeric particles are two-stage acrylic emulsion copolymer particles.

5. The aqueous coating composition of claim 1 further comprising pigment particles.

6. A method for providing a coating comprising:

(a) forming said aqueous coating composition of claim 1;

(b) applying said aqueous coating composition to a substrate; and, drying, or allowing to dry, said aqueous coating composition wherein said provided coating has a 60° specular gloss of from 5 to 25.

7. A coating provided by the method of claim 6 further comprising pigment particles.

8. The coating of claim 7 wherein said coating is below its critical pigment volume concentration.

* * * * *